(12) United States Patent
Alimonti et al.

(10) Patent No.: US 10,527,469 B2
(45) Date of Patent: Jan. 7, 2020

(54) FLOW-RATE MEASURING SYSTEM FOR DRILLING MUDS AND/OR FOR MULTIPHASE MIXTURES

(71) Applicants: Claudio Alimonti, Rome (IT); Donato Bocchetti, Rome (IT); Enio Valletti, Milan (IT)

(72) Inventors: Claudio Alimonti, Rome (IT); Donato Bocchetti, Rome (IT); Enio Valletti, Milan (IT)

( * ) Notice: Subject to any disclaimer, the term of this patent is extended or adjusted under 35 U.S.C. 154(b) by 248 days.

(21) Appl. No.: 15/513,225

(22) PCT Filed: Sep. 22, 2015

(86) PCT No.: PCT/IB2015/057304
§ 371 (c)(1),
(2) Date: Mar. 22, 2017

(87) PCT Pub. No.: WO2016/046751
PCT Pub. Date: Mar. 31, 2016

(65) Prior Publication Data
US 2017/0299414 A1    Oct. 19, 2017

(30) Foreign Application Priority Data

Sep. 22, 2014  (IT) .............................. RM2014A0536

(51) Int. Cl.
*G01F 1/44*    (2006.01)
*G01L 19/06*   (2006.01)
(Continued)

(52) U.S. Cl.
CPC .................. *G01F 1/44* (2013.01); *G01F 1/34* (2013.01); *G01F 1/40* (2013.01); *G01F 15/16* (2013.01);
(Continued)

(58) Field of Classification Search
CPC ..... G01F 1/44; G01F 1/40; G01F 1/36; G01F 1/363; G01F 1/366; G01F 1/38;
(Continued)

(56) References Cited

U.S. PATENT DOCUMENTS 4,024,762 A * 5/1977 Roberts, Jr. ............... G01F 1/46
                                                          73/861.74
4,651,572 A   3/1987 Albertz et al.
(Continued)

FOREIGN PATENT DOCUMENTS

GB       1 579 877 A     11/1980
WO     2005/019713 A1     3/2005

OTHER PUBLICATIONS

International Search Report, dated Jan. 18, 2016, from corresponding PCT application.

*Primary Examiner* — Robert R Raevis
(74) *Attorney, Agent, or Firm* — Young & Thompson

(57) ABSTRACT

Disclosed is a flow-rate measuring system for drilling muds and for multiphase mixtures (water/oil/gas) also with transport of solids or sand and in the presence of heavy oil. The system includes a flow-rate measuring system for drilling muds and/or for multiphase mixtures, wherein the measuring ports are equipped with an appropriate pre-chamber that enables elimination of the risk of failure of the measuring membranes in the case of particularly erosive mixtures and in the case of presence of solid by accumulation or transport. Furthermore, the particular vertical installation enables a compactness of the system in terms of horizontal encumbrance, enables installation where there is little horizontal space, and makes possible an undisturbed flow necessary for obtaining a higher measuring accuracy. The vertical installation enables installation, on the descending stretch, of a sensor for measuring the density that renders the measuring (Continued)

system autonomous (normally, the density is entered as external input).

20 Claims, 5 Drawing Sheets

(51) Int. Cl.
*G01F 1/40* (2006.01)
*G01F 15/16* (2006.01)
*G01F 1/34* (2006.01)
*G01F 1/00* (2006.01)

(52) U.S. Cl.
CPC ............ *G01L 19/0627* (2013.01); *G01F 1/00* (2013.01); *G01L 19/06* (2013.01)

(58) Field of Classification Search
CPC . G01F 1/383; G01F 15/16; G01F 1/34; G01F 1/00; G01L 19/0627; G01L 19/06; G01L 9/0645
USPC ........ 73/23.23, 23.29, 32 R, 152.05, 152.29, 73/152.51, 861.52, 861.61–861.64, 73/861.04, 706
See application file for complete search history.

(56) References Cited

U.S. PATENT DOCUMENTS

| | | | |
|---|---|---|---|
| 5,861,546 A | 1/1999 | Sagi et al. | |
| 6,289,745 B1* | 9/2001 | Bowers | G01F 1/46 73/861.66 |
| 6,920,795 B2* | 7/2005 | Bischoff | G01L 19/0007 73/706 |
| 2003/0127850 A1 | 7/2003 | Bischoff et al. | |
| 2006/0162466 A1* | 7/2006 | Wargo | G01F 1/363 73/861.63 |
| 2008/0245158 A1 | 10/2008 | Hedtke | |
| 2011/0214757 A1* | 9/2011 | Igarashi | G01F 1/363 137/511 |
| 2014/0260658 A1* | 9/2014 | Strom | G01F 1/3218 73/861.01 |
| 2015/0134275 A1* | 5/2015 | Chen | G01F 1/88 702/47 |

\* cited by examiner

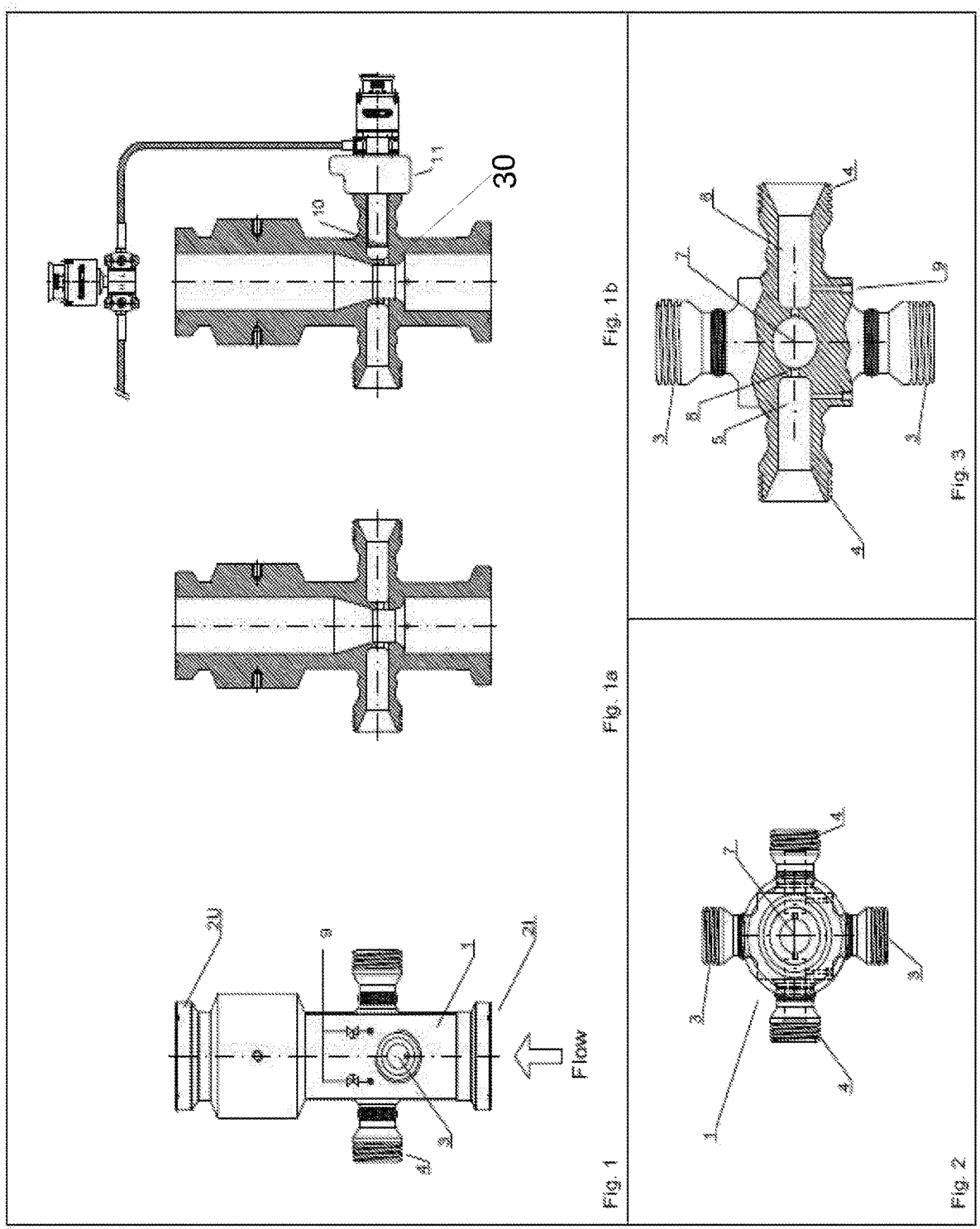

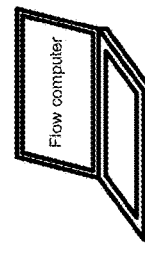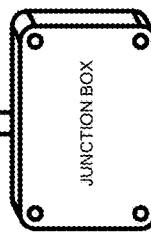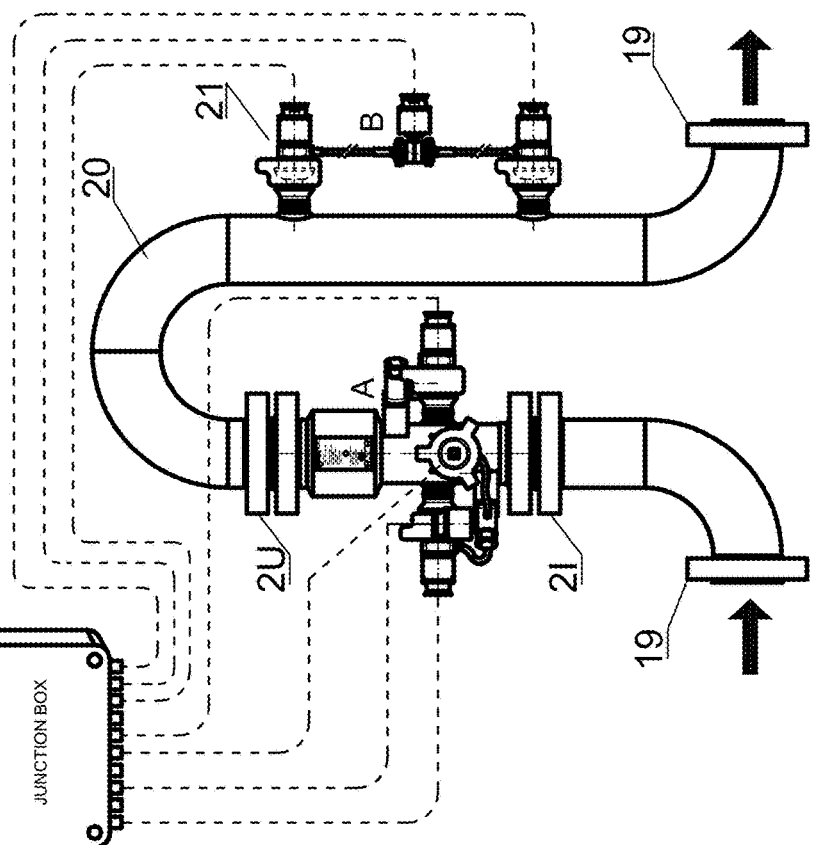
Fig. 10
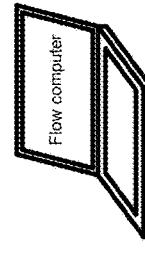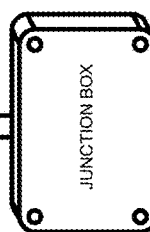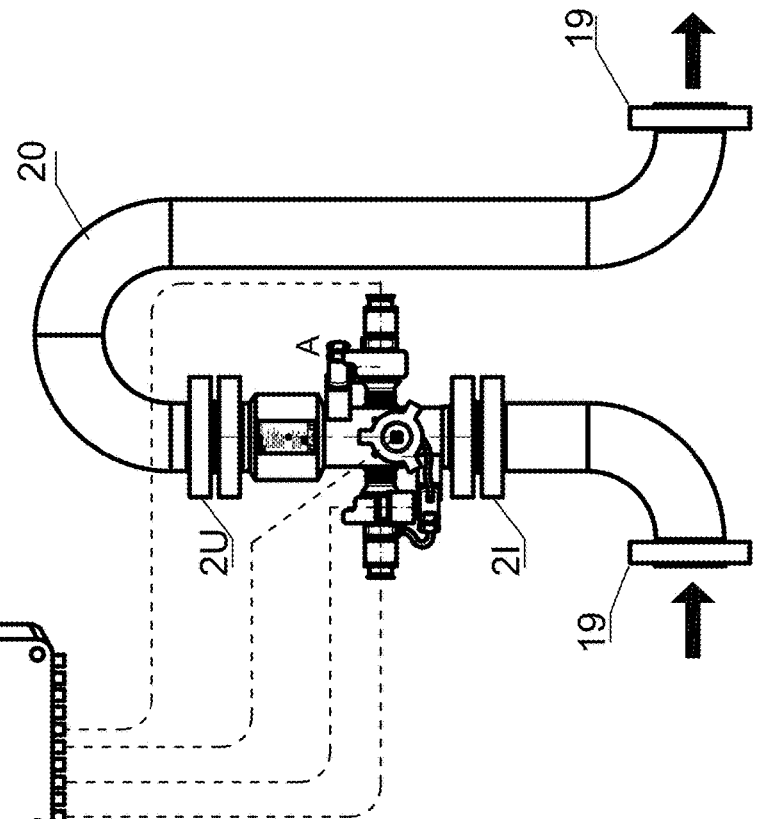
Fig. 9

FLOW-RATE MEASURING SYSTEM FOR DRILLING MUDS AND/OR FOR MULTIPHASE MIXTURES

TECHNICAL FIELD

The invention basically regards a flow-rate measuring system for drilling muds and for multiphase mixtures (water/oil/gas) also with transport of solids or sand and in the presence of heavy oil.

PRIOR ART

The present invention regards innovations applied to a Venturi tube that is frequently used for measuring the flow rate of fluids. Indirect measurement of the flow rate of liquids and gases is obtained by making a direct measurement of the drop in pressure between upstream and downstream of the restriction the pipe and a measurement of the absolute pressure and temperature of the mixture that is travelling, values which then, by using appropriate fluid-dynamic models, enable determination of the flow rate. The precision of the measurement is conditioned by the accuracy of the measurement of the quantities referred to previously, by the reliability of the aforesaid measurements in each condition of flow, and by the combination of appropriate and suitable fluid-dynamic models and appropriate integration of the system with the plant.

Known from U.S. Pat. No. 5,861,546 is a device that functions and can only function on gas. It does not envisage any pre-chamber, nor rinsing flow, and moreover the membranes are not removable. A person skilled in the "oil & gas" sector would never take into consideration the document U.S. Pat. No. 5,861,546 for applications in the presence of mud.

U.S. Pat. No. 4,651,572 describes a device based upon the Venturi tube for measurement of the flow. Said device is not suitable for mud and envisages a porous coating that is useful only for gases. It does not describe any measuring membrane within the pre-chamber, and no washing with liquids is envisaged.

Also known from U.S. 2008/245158 is a device constituted by a typical differential-pressure transmitter (Emerson process/Rosemount measurement), with a particular patented characteristic constituted by two coplanar measuring diaphragms mounted integrally, i.e., made of a single piece. Provision of an integral orifice has been known for many decades. Unlike the present invention, on that device no measuring chamber is provided (which in the present invention is a specific measuring chamber with washing or cleaning functions). The measuring chambers described in U.S. 2008/245158 are the most standard ones available on any differential-pressure measurement cell. Unlike U.S. 2008/245158, the membranes according to the present invention are provided on remote, multiparametric probes and are easy to replace without removing the measuring device. The constructional technical solution of U.S. 2008/245158 is not suitable for application in the presence of mud.

Moreover, U.S. 2003/127850 describes a device that is characterized in that it is obtained with insulating membranes completely obtained using machine tools. This constructional technical solution does not enable extraction of the measuring membrane as in the case of present invention nor does it enable washing/cleaning of the measuring chamber while the device is operating. Moreover, in U.S. 2003/127850 use of the device disclosed is not described nor suggested for measuring the flow of muds. Also in the case of U.S. 2003/127850, the technical solution is not suited for application in the presence of mud.

Finally, GB 1579877 describes a device that functions in a way that is intermittent/discontinuous, i.e., not continuous. The device requires rinsing via a liquid that acts as sealing fluid between the process fluid and the measurement sensor. A timed purging keeps this piping clean by discharging the undesired substances in the flowing medium. Unlike GE 1579877, the measuring diaphragms in the present invention carry out a continuous (non-intermittent) measurement and are in direct contact with the process fluid; they do not require a purposely sized purging piping. Moreover, the device according to the present invention has absolutely no need for frequent purging/rinsing operations that are not allowed on mud, in so far as the device of GB 1579877 would contaminate the process fluid through frequent rinsing with other liquids. GB 1579877 is hence not applicable in the presence of mud.

TECHNICAL PROBLEMS TO BE SOLVED

Mud is the fluid that facilitates drilling of wells in the ground. It may have a water base, an oil base, or a base of a gaseous fluid. It is pumped at high pressure (with a rating of up to 5 to 10 kpsi or more) in oil wells or gas wells during drilling. The return mud contains solid parts of different sizes and characteristics and may contain gases. This fluid is special in so far as it can be considered right from the start as a multiphase fluid, containing liquids, solids, and gas, which may cause erosion and corrosion. To obtain precise measurements, a long experience is necessary in order to adopt appropriate computing algorithms supported by reliable sensing and measuring devices. Currently, even specifically designed products do not cover all the varieties of muds. Magnetic flowmeters do not measure mud with an oil base or mud containing gas and so far cannot withstand very high pressures. Coriolis-effect meters are used only with low output pressures but are not completely reliable.

The present invention solves the problems and the limits of applicability of the Venturi tube in the drilling sector where the particular characteristics required by the drilling mud, to adapt to the various types of rock, can consequently create problems and limit the reliability in the measuring membranes. The very tendency of mud to create a panel may in the long run vitiate the measurement and alter the values detected by the sensors themselves. Furthermore, the critical nature of the application requires easy and prompt maintenance and a high degree of reliability of each component, as well as a constancy and repeatability of the measurement. In addition, the present invention solves similar problems also in multiphase mixtures (water, oil, and gas) where heavy oil or the transport of solids or sand and deposit of waxes create problems similar to those created by the drilling mud.

The aforesaid invention increases the reliability and accuracy of the measurement of the flow rate in addition to that of the other quantities concerned, thus enabling compact construction of the entire system with ease and simplicity of access to the components for the operations of purging and washing both of the measuring chamber and of the flowline, as well as of replacement of the sensor system.

The subject of the present invention is basically a flow-meter of a Venturi type, suitable for measuring oil-based or water-based muds and multiphase liquids, even in the presence of gas. The flowmeter is provided with pre-chambers made of a single piece, which are in communication with the main fluid flow through a duct, the measuring diaphragms being installed in the pre-chambers to prevent any damage from erosion.

Advantages of the Invention

A Venturi measuring system based upon the present invention affords a series of advantages.

The particular arrangement of the sensors enables a very compact unit to be obtained, even though it is equipped with ten sensors that enable measurement of the quantities involved in the process. Furthermore, the particular way in which the connections to the process are made enables a convenient maintenance of the system and speeds up any possible replacement of the sensors. The particular arrangement of the ports for connection to the process enables positioning of two DP sensors with different calibrations so as to be able to extend the range of measurement of the flow rates, maintaining an optimal measuring accuracy. The measuring ports are equipped with an appropriate pre-chamber that enables elimination of the risk of failure of the measuring membranes in the case of particularly corrosive mixtures and in the case of presence of solids by accumulation or transport.

The aforesaid pre-chambers are built with dimensions suitable for the type of fluid or for the flow rates or the accuracy required in the measurement of the flow rate, and the bottom is rounded/chamfered. Furthermore, to prevent any deposit of solids or formation of mud panel or deposit of waxes, in the case of oil, the pre-chamber is equipped with a cleaning system obtained with a tangential-spray nozzle, which either manually or with a timed system, by introducing appropriate liquid or gaseous mixtures, carries out washing.

In the case of measurements made on multiphase mixtures of water, oil, and gas, the system also enables purging of the products accumulated in order to keep the pre-chamber clean and obtain accurate measurements.

The compactness of the system is guaranteed by the development of a dedicated sensor system obtained by integrating in the separators of the differential cell the pressure and temperature sensors. This reduces the number of connections to the process, thus enabling a very compact implementation.

For instance, a possible vertical installation—in a horizontal stretch of piping—can be carried out by using a stretch of piping shaped like a U turned upside down, which advantageously enables installation of the system in conduits where there is little space available horizontally.

A better understanding of the invention will be obtained with reference to the attached drawings, which illustrate a preferred embodiment and examples of installation.

In the drawings:

FIGS. 1, 1A, and 1B are, respectively, a side elevation of the invention, an axial cross-sectional view, and an axial cross-sectional view with the sensor installed;

FIG. 2 is a top plan view of the invention;

FIG. 3 is a partially sectioned top plan view;

Figure 4:
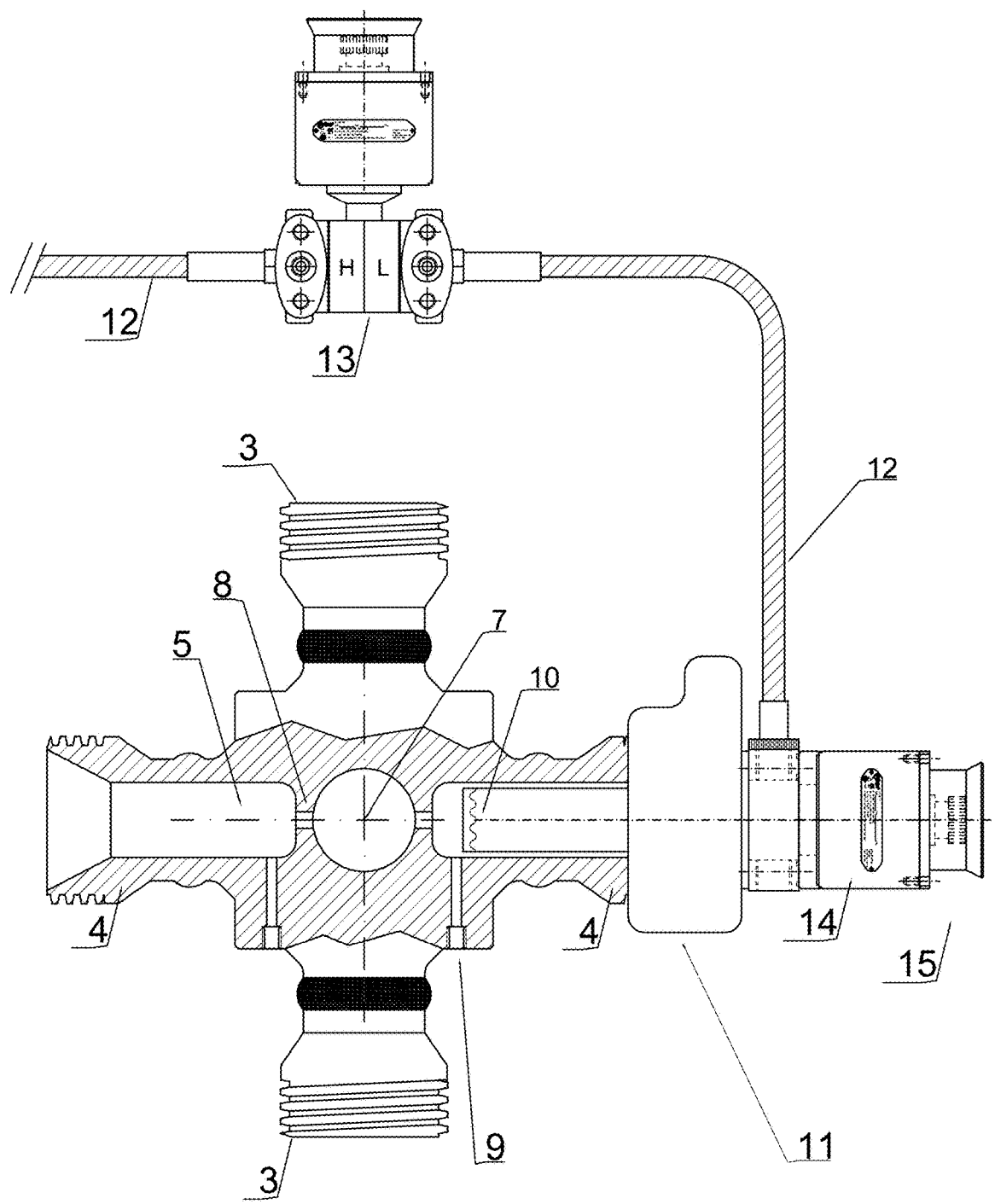
Figure 6:
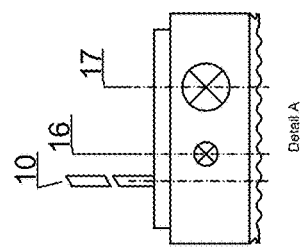
Figure 5:
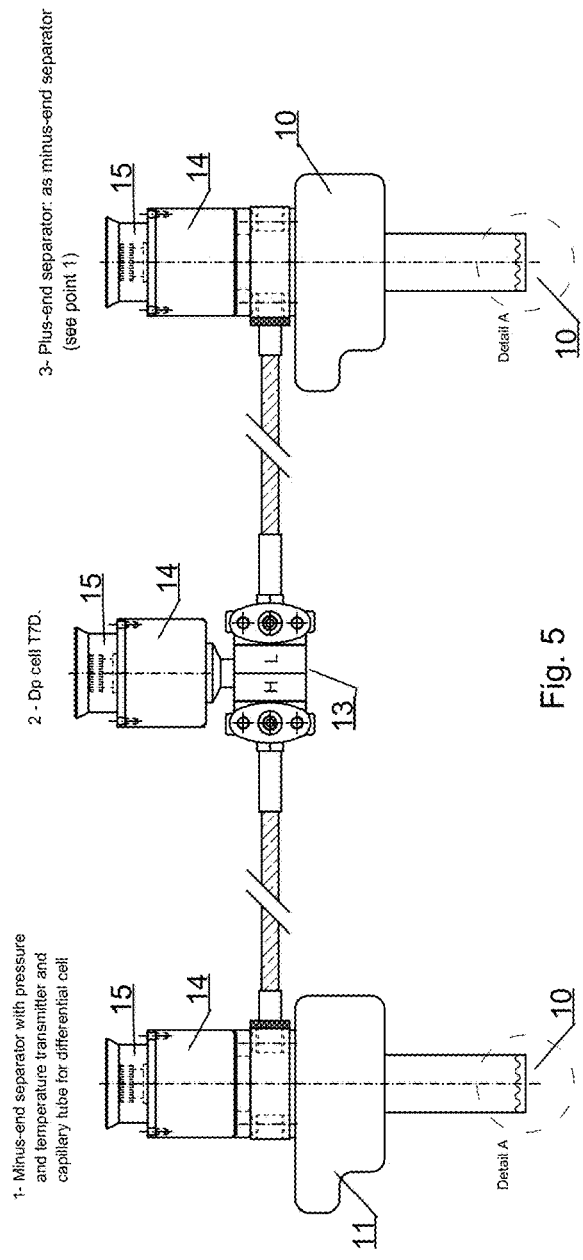
Figure 7:
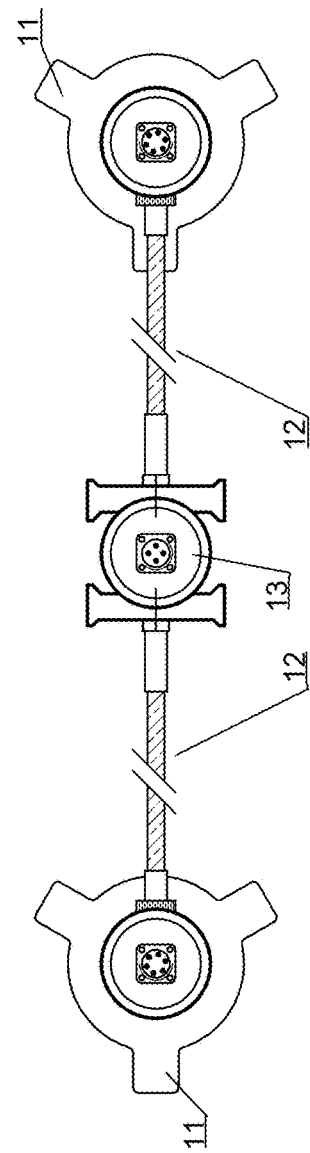
Figure 8:
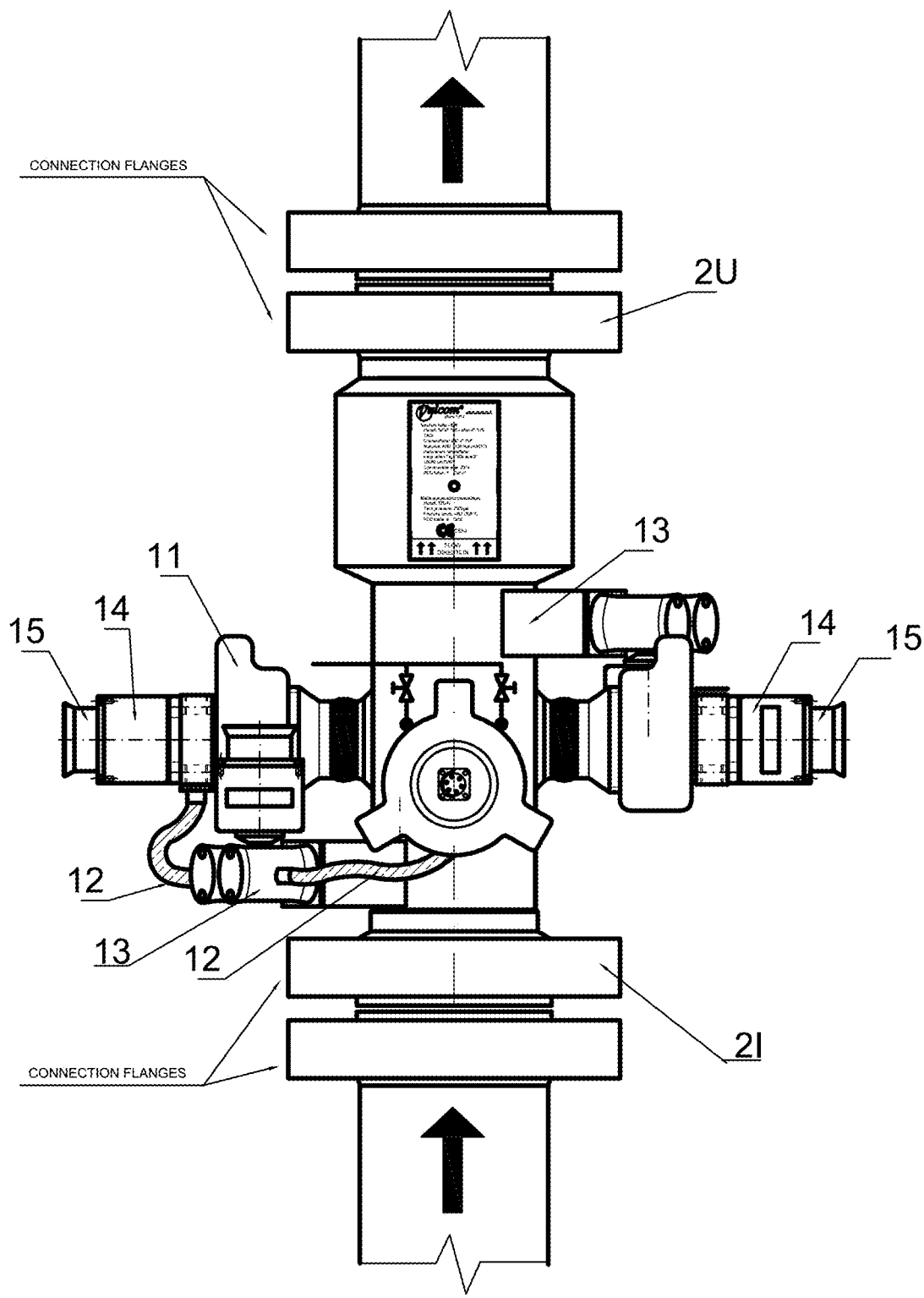

FIG. 4, which is similar to FIG. 3, shows a sensor installed;

FIG. 5 is a side view that shows two sensors connected to the differential cell;

FIG. 6 snows an enlarged detail of the measuring membrane (or diaphragm), with the temperature sensor, the pressure sensor, and the capillary tube for the differential cell;

FIG. 7 is a top plan view corresponding to that of FIG. 5;

FIG. 8 shows the invention mounted along a piping, with all the sensors installed;

FIG. 9 shows the invention installed with a particular configuration, with vertical mounting in a horizontal piping; and FIG. 10, which is similar to the previous one, shows the invention installed in series on a dynamic density meter.

DESCRIPTION OF AN EXAMPLE OF EMBODIMENT OF THE INVENTION

The attached figures are cross-sectional views of the invention and show the layout of the sensor system and the peculiar vertical installation, with measurement of fluid density. In addition, the compensation pre-chambers and the washing nozzles are clearly indicated.

With reference to the figures, the invention is basically constituted by a body 1 comprising a longitudinal stretch of piping 7 equipped with inlet end attachments 2I, and outlet end attachments 2U, of the flanged (or weld or clamp) type, for fixing to the piping flowing in which is the fluid the flow rate of which is to be measured.

In the part of the body 1, towards the inlet end flange 2I, two pairs of opposed attachments 3 and 4 are provided, set at 90° apart, for installing the measuring probes, wherein said attachments are set radially with respect to the longitudinal axis of the tubular body 1, i.e., perpendicular to the direction of the flow of the fluid to be measured.

According to a peculiar characteristic of the invention, provided inside each of said attachments 3 and 4, which are preferably of the wing-union type or of some other type required by the specific installation, is a measuring chamber 5 (also referred to as "pre-chamber") with spoked/chamfered bottom 6, which is in turn connected to the longitudinal central duct 7 with single or multiple pressure ports 8 (FIG. 3). The pre-chamber is connected to the inside of the tubular body only by an eccentric hole 30 which is located in correspondence with the lateral surface of the chamber 5.

A further peculiar characteristic of the invention lies in the fact that provided in the proximity of the bottom of each of the measuring chambers 5 is a tangential port 9 for washing/purging of the chamber itself.

With reference to FIG. 4, the device according to the invention is illustrated with a measuring probe installed, with sensors having a measuring membrane 10 inserted in the measuring chamber 5, fixed in position via a ring-nut 11 of a hammer-union type, equipped with a capillary tube 12 for connection to the differential cell 13, which is in turn connected to the measuring probe with membrane sensors 10 installed in the adjacent attachment that is perpendicular to the previous one (FIG. 8).

Each measuring probe is equipped with amplifiers 14 and a connector with plug 15. Moreover, the end of the probe provided with measuring membrane 10 is also equipped with capillary tube 16 for the differential cell 13, with a temperature sensor 17, and with a pressure sensor 18 (FIGS. 5, 6, and 7).

More specifically, as may be seen in FIG. 6, each membrane 10 makes a measurement of pressure, temperature, and differential pressure (DP). Altogether, two membranes make five measurements (DP is one for two membranes). In the dual-range solution illustrated in the figures, membranes 10 are four for ten measurements.

In addition, it should be noted that, envisaging the use of hammer unions, the operations of maintenance of the system are facilitated, and any possible replacement of the sensors, which are basically constituted by just two measuring membranes 10 for five measurements, is speeded up.

Among the peculiar characteristics of the invention, the following are to be pointed out:

compactness of the system;

presence of an insert made of special material for increasing resistance to erosion;

compensation chambers connected to the process with one or more holes;

multi-parametric membrane sensors that in one and the same membrane measure P, T, and DP;

redundancy of the measurement and hence reliability;

extended range of the measurement with dual DP in a compact system;

tangential-washing system;

purging system;

autonomous washing system timed on the basis of the pressures and the type of mud, as well as the tendency of the latter to form a panel within a pre-determined period of time;

presence of two measuring apparatuses that work simultaneously, ensuring continuity of the measurement also in the case of partial damage to the sensor system;

time interval for washing the pre-chamber that can be managed via a timer or other similar device; and with reference to the two previous points, a smart software that can advantageously be provided for intervening in the event of failure of a differential cell and for calculating the time for washing the pre-chamber.

With reference to FIG. 9, another interesting aspect of the invention is represented by the fact that, even though the installation can be carried out in a horizontal, vertical, or inclined configuration in the case where the plant line presents little horizontal space for installation of a Venturi meter, a vertical installation is envisaged via a purposely designed U-shaped stretch of piping 20, which is equipped with a flange 19 for connection to the ends of the stretch of horizontal piping in which the flow rate is to be measured. In this case, the flow-rate measuring system described is installed in one of the two branches of the U-shaped stretch of piping 20, which are set vertically.

Advantageously, with this arrangement, even though the stretch of horizontal piping available in the plant has a length insufficient for enabling installation of a Venturi meter, it is possible to overcome this problem by providing, in the horizontal space effectively available, a vertical stretch of piping having a length sufficient for installation of the flow-rate measuring system 1 according to the invention.

A further advantage is represented by the fact that, in the case referred to above, where a purposely designed U-shaped stretch of piping 20 is installed, the vertical branch of the U-shaped stretch of piping that is not concerned by installation of the flow-rate measuring system 1, can advantageously be used for carrying out the measurement of density, installing thereon a densimeter 21, which, as is known, uses a differential cell for measuring DP, which cannot be installed on horizontal lines.

Yet a further advantage of the invention lies in the fact that, in the case where the aforesaid U-shaped stretch of piping is used, measurements of fluid flow rates and possibly of fluid density can be made, eliminating the problems that might arise from installation in stretches of piping where there are marked variations of the cross section or other problems that might jeopardize the validity of the measurement itself. In this connection, it should be noted that, in the piping of plants, the presence of convergence, divergence, or bends gives rise to formation of a flow that is not stabilized and of turbulence that causes major measurement errors. Frequently, modifications to the lines are made without taking into account the problems created for the flow. Installation of the device according to the invention via the aforesaid U-shaped stretch of piping avoids these problems.

Finally, it should be noted that the specific Venturi design of the internal path of the flow and the external machining, combined with a positioning at 90° of the measuring chambers with a specific positioning of the ducts for communication with the current of the main flow, as well as the specific use of the pressure hammer unions, are all characteristics that—combined together according to the present invention—enable provision of a compact unit (for example, a length of just 650 mm for a 5" XXS pipe for pressures of up to 10 000 psi—10 kpsi CWP and up to 10 variables detected) to be placed on a drilling platform where the space is always extremely limited and where standard and cumbersome installations might not be acceptable from the technical standpoint. Moreover this would mean rather high production costs.

LEGEND

1. Venturi tube obtained from a bar for measurement of flow rate, complete with dual differential port 2I, 2U. Flanged/weld/clamp attachment 3, 4. Attachments (of the wing-union type or else as required)

5. Measuring chamber

6. Spoked/chamfered bottom

7. Venturi tube for passage of fluid

8. Single or multiple pressure port

9. Tangential-washing and purging system for each measuring chamber (manual or automatic)

10. Measuring membrane

11. Figure 1502 hammer union

12. Capillary tube for connection of DP cell to separators

13. Differential cell

14. Amplifiers

15. Connector with plug

16. Capillary tube for differential cell

17. Temperature sensor

18. Pressure sensor

A. Venturi tube and multiparametric probes—vertical installation

B. Dynamic density meter integrated in the Venturi-tube flowmeter

The invention claimed is:

1. A flow-rate measuring system for drilling muds and/or for multiphase mixtures, the system comprising:

a tubular body; and measuring ports are provided with a respective pre-chamber and respective measuring membranes disposed within the respective pre-chamber, wherein, in order to prevent deposit of solids or mud-panel formation or deposit of waxes, each pre-chamber is equipped with a cleaning system provided with a nozzle tangential to the lateral surface of the pre-chamber to wash the pre-chamber, the nozzle being configured to be operated manually or with a timed system by introducing liquid or gaseous mixtures, wherein each pre-chamber is connected to the inside of the tubular body only by an eccentric hole which is located at the lateral surface of the chamber, the eccentric hole being eccentric to a center line of the chamber, said eccentric hole being located at a smallest-diameter area of a longitudinal central duct of said tubular body, and wherein each pre-chamber communicates with a fluid flowing path through the eccentric hole.

2. The measuring system as claimed in claim 1, wherein the ports comprise two pairs of opposed attachments, set at 90° with respect to one another, configured to attach to and install measuring probes,
wherein said attachments are set radially with respect to the longitudinal axis of the tubular body, the attachments being set perpendicular to the direction of the flow of the fluid to be measured, to be able to position two differential-pressure sensors with different calibrations to be able to extend the range of measurement of the flow rates, each of said respective attachments being provided with said respective pre-chamber.

3. The measuring system as claimed in claim 2, wherein the system further comprises sensors that measure the quantities involved in the process.

4. The measuring system as claimed in claim 3, wherein mounting of the sensors on the attachments that are equipped with said pre-chambers is carried out via hammer unions to enable convenient maintenance of the system and speed up possible operations of replacement of the sensors.

5. The measuring system as claimed in claim 2, wherein the flow-rate measuring system is configured to be installed in one of two branches of a vertical installation of a U-shaped stretch of piping that are set vertically, the U-shaped stretch of piping being equipped with flanges for connection to ends of a stretch of horizontal piping in which the flow rate is to be measured.

6. The measuring system as claimed in claim 2, the measuring system further comprises a sensor system fitted into said pre-chambers, obtained by integrating, in separators that separate a differential cell, pressure and temperature sensors, thus obtaining reduction of the number of attachments, affording compact dimensions.

7. The measuring system as claimed in claim 1, further comprising sensors configured to measure quantities of fluid.

8. The measuring system as claimed in claim 7, wherein mounting of the sensors on attachments equipped with said pre-chambers, is carried out via hammer unions to enable convenient maintenance of the system and speed up possible operations of replacement of the sensors.

9. The measuring system as claimed in claim 7, wherein the sensors are part of a sensor system fitted into said pre-chambers, obtained by integrating in separators that separate a differential cell, pressure and temperature sensors, thus obtaining reduction of the number of attachments, affording compact dimensions.

10. The measuring system as claimed in claim 7, wherein the flow-rate measuring system is configured to be installed in one of two branches of a vertical installation of a U-shaped stretch of piping that are set vertically, the U-shaped stretch of piping being equipped with flanges for connection to ends of a stretch of horizontal piping in which the flow rate is to be measured.

11. The measuring system as claimed in claim 1, wherein sensors are mounted on the attachments that are equipped with said pre-chambers, using hammer unions to enable convenient maintenance of the measuring system and speed up operations of replacement of the sensors.

12. The measuring system as claimed in claim 11, wherein the sensors are part of a sensor system fitted into said pre-chambers, obtained by integrating in separators that separate a differential cell, pressure and temperature sensors, thus obtaining reduction of the number of attachments, affording compact dimensions.

13. The measuring system as claimed in claim 11, wherein the flow-rate measuring system is configured to be installed in one of two branches of a vertical installation of a U-shaped stretch of piping that are set vertically, the U-shaped stretch of piping being equipped with flanges for connection to ends of a stretch of horizontal piping in which the flow rate is to be measured.

14. The measuring system as claimed in claim 1, wherein said nozzle is connected to the pre-chamber via a duct, which, when measurements are made on multiphase mixtures of water, oil, and gas, enables purging of products accumulated in order to keep the pre-chamber clean and maintain accuracy of measurement.

15. The measuring system as claimed in claim 14, wherein the measuring system further comprises a sensor system fitted into said pre-chambers, obtained by integrating in separators that separate a differential cell, pressure and temperature sensors, thus obtaining reduction of the number of attachments, affording compact dimensions.

16. The measuring system as claimed in claim 14, wherein the flow-rate measuring system is configured to be installed in one of two branches of a vertical installation of a U-shaped stretch of piping that are set vertically, the U-shaped stretch of piping being equipped with flanges for connection to ends of a stretch of horizontal piping in which the flow rate is to be measured.

17. The measuring system as claimed in claim 1, in order to reduce the overall dimensions, the measuring system further comprises a sensor system fitted into said pre-chambers, obtained by integrating in separators of a differential cell the pressure and temperature sensors, thus obtaining reduction of the number of attachments, affording compact dimensions.

18. The measuring system as claimed in claim 17, wherein the flow-rate measuring system is configured to be installed in one of two branches of a vertical installation of a U-shaped stretch of piping that are set vertically, the U-shaped stretch of piping being equipped with flanges for connection to ends of a stretch of horizontal piping in which the flow rate is to be measured.

19. The measuring system as claimed in claim 1, wherein the flow-rate measuring system is configured to be installed in one of two branches of a vertical installation of a U-shaped stretch of piping that are set vertically, the U-shaped stretch of piping being equipped with flanges for connection to ends of a stretch of horizontal piping in which the flow rate is to be measured.

20. The measuring system as claimed in claim 19, wherein a densimeter sensor cell is installed on one of the vertical branches of the U-shaped stretch of piping that is not concerned by installation of the flow-rate measuring system.

\* \* \* \* \*